US006728584B1

(12) United States Patent
Duan et al.

(10) Patent No.: US 6,728,584 B1
(45) Date of Patent: Apr. 27, 2004

(54) SYNCHRONIZATION AND MIXING OF MULTIPLE STREAMS AT DIFFERENT SAMPLING RATES

(75) Inventors: Tieying Duan, Richmond Hill (CA); Vladimir F. Giemborek, Richmond Hill (CA); John S. Kitamura, Toronto (CA)

(73) Assignee: ATI Technologies, Ontario (CA)

( * ) Notice: Subject to any disclaimer, the term of this patent is extended or adjusted under 35 U.S.C. 154(b) by 0 days.

(21) Appl. No.: 09/145,714

(22) Filed: Sep. 2, 1998

(51) Int. Cl.[7] .............................................. G06F 17/00
(52) U.S. Cl. ......................... 700/94; 381/119; 713/400
(58) Field of Search ........................... 700/94; 381/119; 713/400, 503; 375/225, 222, 260, 355, 145, 149; 341/61

(56) References Cited

U.S. PATENT DOCUMENTS 5,729,227 A * 3/1998 Park .......................... 341/100
6,404,771 B1 * 6/2002 Gulick ...................... 710/100

* cited by examiner

*Primary Examiner*—Ping Lee
(74) *Attorney, Agent, or Firm*—Vedder, Price, Kaufman & Kammholz, P.C.

(57) ABSTRACT

The invention synchronizes and mixes multiple streams at different sampling rates by selectively accessing portions of the received streams in a sequence that allows for independent input and output frame rates. The sequence that is used to access the received streams is irregular with regard to the output frames, and formulated such that the input and output frames are synchronized to a super-frame that corresponds to a least common multiple frame in a conventional synchronizing and mixing system.

6 Claims, 11 Drawing Sheets

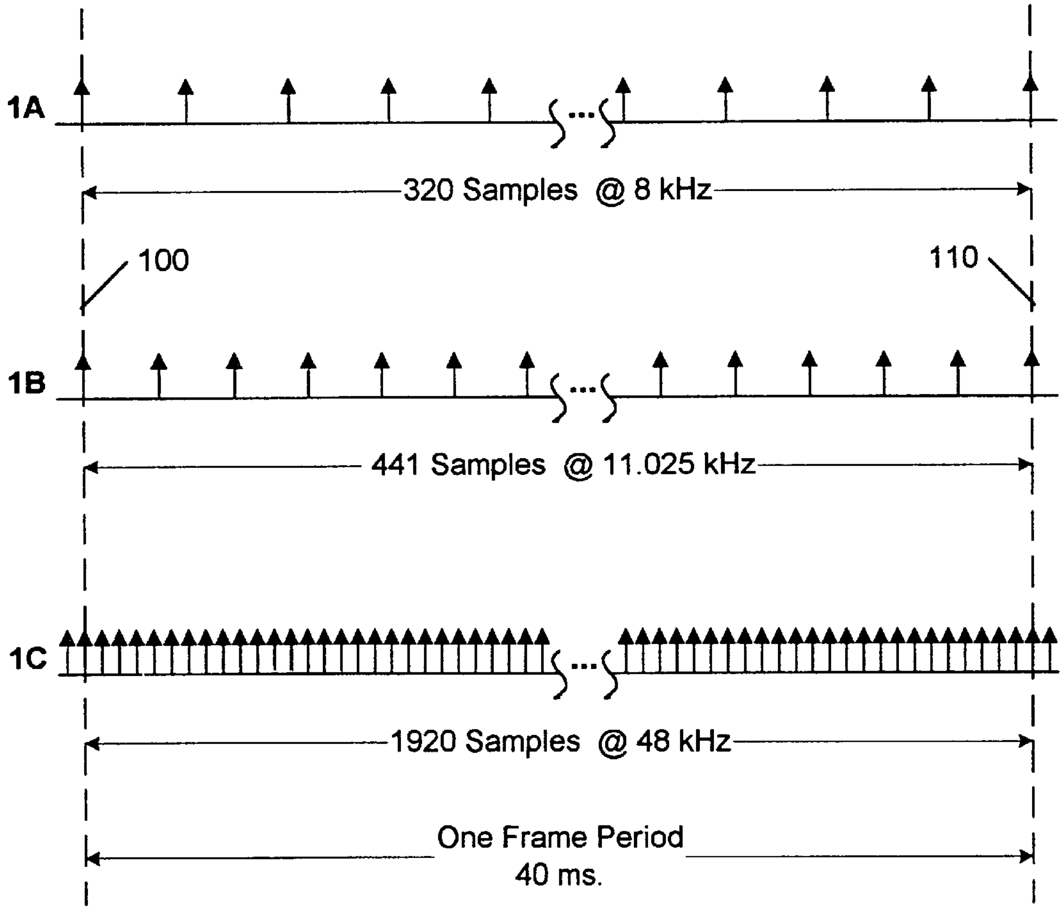
FIG. 1 [Prior Art]

| | | | |
|---|---|---|---|
| Pass 1 | $A_1$ | $B_{1*}$ | $Q_1$ |
| Pass 2 | $A_2$ | $B_{2*}$ | $Q_2$ |
| Pass 3 | $A_3$ | $B_{3*}$ | $Q_3$ |
| Pass 4 | $A_4$ | | $Q_4$ |
| Pass 5 | $A_5$ | $B_{4*}$ | $Q_5$ |
| Pass 6 | $A_6$ | $B_{5*}$ | $Q_6$ |
| Pass 7 | $A_7$ | $B_{6*}$ | $Q_7$ |
| Pass 8 | $A_8$ | | $Q_8$ |
| Pass 9 | $A_9$ | $B_{7*}$ | $Q_9$ |
| Pass 10 | $A_{10}$ | $B_{8*}$ | $Q_{10}$ |
| Pass 11 | $A_{11}$ | $B_{9*}$ | $Q_{11}$ |
| Pass 12 | $A_{12}$ | | $Q_{12}$ |
| Pass 13 | $A_{13}$ | $B_{10*}$ | $Q_{13}$ |
| Pass 14 | $A_{14}$ | $B_{11*}$ | $Q_{14}$ |
| Pass 15 | $A_{15}$ | $B_{12*}$ | $Q_{15}$ |
| Pass 16 | $A_{16}$ | | $Q_{16}$ |

* process 120 samples only

FIG. 7

SYNCHRONIZATION AND MIXING OF MULTIPLE STREAMS AT DIFFERENT SAMPLING RATES

FIELD OF THE INVENTION

This invention relates to the field of digital signal processing, and in particular to the field of audio signal synchronization and mixing.

BACKGROUND OF THE INVENTION

The use of digital encoding of analog signals has increased significantly over the past decade. Laser discs (CDs, DVDs, etc.) are used for the storage of audio and video information in digital form. Digital audio tapes (DATs) are also used to store audio information on magnetic tape. Digital transfer protocols, such as MIDI (Musical Instrument Digital Interface) and others, are used to transfer audio information among equipment such as music synthesizers, as well as to communicate audio recordings via the Internet. Computers commonly contain audio processing systems, such as MWAV, for processing and reproducing audio signals that are recorded in a digital form.

The evolution of digital encoding of audio signals has been diverse. As a result, a number of differing sampling rates are commonly used to encode audio signals. Digital telephone systems, for example, typically sample speech at 8 kHz. European long-haul microwave communications links use a 32 kHz sampling rate. Typically CD recordings have a sampling rate of 44.1 kHz, derived originally from television system frequency relationships. Computer audio processing systems typically support the use of 11.025, 22.05 and 44.1 kHz sampling. Professional audio processing and mixing equipment use a 48 kHz sampling rate.

A combination, or mixing, of audio information from multiple sources requires that the information be synchronized to a common time base. The most straightforward means of effecting such mixing is to decode the digital encodings into audio signals, mix the audio signals as required with an analog audio frequency mixer, then encode the composite result into a digital form. Such a mixer, however, requires a decoder for each digital signal being decoded, and requires that each decoder operate at the appropriate sampling frequency. Also, any noise that is introduced by the analog audio frequency mixer will degrade the quality of the resultant composite signal.

An alternative method of mixing audio information that is encoded in digital form is to convert each of the digital encodings to a common time base by modifying the differing sampling rates to a common sampling rate. Each encoding is up-converted to the highest sampling rate supported by the mixer, because a down-conversion of an encoding to a lower sampling rate results in a loss of high frequency information in the encoding. Each digital encoding that is mixed in a professional audio system, for example, is upsampled to 48 kHz. With each encoding having the same sampling rate, the mixing of signals is effected by a weighted arithmetic sum of the samples from each encoding. Consider, for example, the mixing of an 8 kHz sampled encoding with an 11.025 kHz sampled encoding to produce a 48 kHz sampled composite. Each of the 8 kHz samples will result in 6 samples at the 48 kHz sampling rate. Each of the 11.025 kHz samples will result in 4.3537 samples at the 48 kHz sampling rate. In principle, the 6 samples from the 8 kHz sampled signal and the 4.3537 samples from the 11.025 kHz sampled signals will be added together to produce 6 samples at 48 kHz.

However, as is evident to one of ordinary skill in the art, fractional samples are a misnomer. Conventionally, the input and output streams are synchronized to the shortest time period in which they each provide an integer number of samples. This synchronization period is termed a frame period. The frame period is typically the least common multiple of the periods required of each input to produce an integer number of output samples. To allow for the synchronization of the streams at periodic intervals, each of the input sampling functions and the output sampling function must periodically produce an integer number of samples at the same time. In the above example of 8 kHz, 11.025 kHz and 48 kHz sampling functions, 40 milliseconds is the shortest time period in which each of these functions produce an integer number of samples. In 40 milliseconds, 1920 samples at 48 kHz are produced. That is, 1920 is the smallest number of samples at 48 kHz that can be produced by an integer number of samples at 8 kHz and an integer number of samples at 11.025 kHz:

320 samples@8 kHz=1920 samples@48 kHz.

441 samples@11.025 kHz=1920 samples@48 kHz.

This relationship is shown in FIG. 1. Each vertical arrow in FIG. 1 represents a sample. Line 1A represents the samples at 8 kHz, line 1B represents the samples at 11.025 kHz, and line 1C represents the samples at 48 kHz. The frame size of the 8 kHz samples is 320 samples; the frame size of the 11.025 kHz samples is 441 samples; and the frame size of the 48 kHz samples is 1920 samples. The frame period of each of these 8 kHz, 11.025 kHz and 48 kHz frames is 40 milliseconds. As can be seen, at the beginning 100 and end 110 of the 40 millisecond frame period, the 8 kHz and 11.025 kHz input samples, and the 48 kHz output sample are synchronous (occur at the same time). Elsewhere throughout the frame period, the 8 kHz input and the 11.025 kHz input samples are not synchronous. The synchronization among the inputs and output is maintained by defining the number of samples of each input and output corresponding to an equal frame period, and thereafter assuring that each input and output frame begin at the same time.

Conventional mixers include buffers that allow for the collection and processing of input and output samples on a per-frame basis. Each input source in the above example requires, for example, a buffer that is sufficient to hold the incoming samples of a frame, as well as a buffer that is sufficient to hold the 1920 samples that are produced for the frame. The storage of thousands of samples can be cost prohibitive, and can substantially affect the cost and/or feasibility of integrating audio synchronization and mixing techniques into integrated circuits.

To allow for the use of less memory, the output sampling rate can be reduced. In the above example, the buffer requirements can be reduced by half if the output sampling rate is reduced to 24 kHz. However, such an encoding will result in a loss of quality from those inputs that have a sampling rate greater than 24 kHz. By the Nyquist theorem, a sampling rate of 24 kHz can be used to sample an input having a highest frequency of 12 kHz, which is below the conventionally acceptable professional standard of 20 kHz for music and other audio recordings.

Therefore, a need exists for a synchronization method and apparatus that allows for the synchronization and mixing of signals that uses a minimal amount of memory without adversely affecting the processing efficiency.

BRIEF DESCRIPTION OF THE DRAWINGS

FIG. 1 illustrates a timing diagram for the conventional synchronization of two streams of data having different sampling rates.

FIG. 7 illustrates an example sequence pattern for the loading of input and output frame buffers having differing frame sizes in accordance with this invention.

FIG. 10 illustrates one example of a method for synchronizing multiple streams of data in accordance with one embodiment of the invention.

DETAILED DESCRIPTION OF THE PREFERRED EMBODIMENT

The invention synchronizes and mixes multiple streams at different sampling rates by selectively accessing portions of the received streams in a sequence that allows for independent input and output frame rates. The buffer size that is allocated to each input and output determines each input and output frame rate. The sequence that is used to access the received streams is irregular with regard to the output frames, and formulated such that the input and output frames are synchronized to a super-frame that corresponds to a least common multiple frame in a conventional synchronizing and mixing system.

Figure 2A:
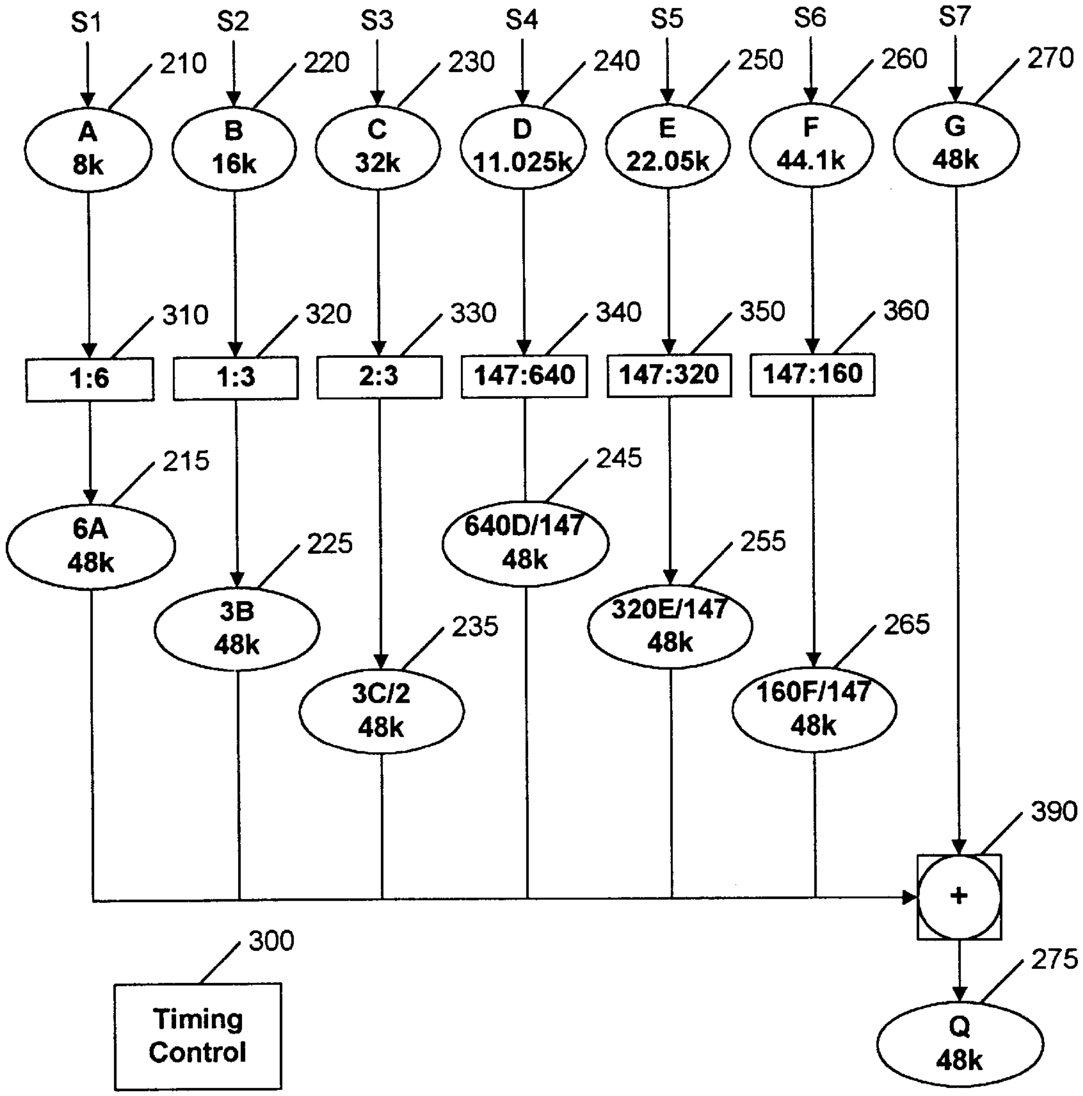
FIGS. 2A and 2B illustrate an example block diagram of a system that synchronizes multiple streams of data having different sampling rates in accordance with this invention.

FIG. 2A illustrates an example embodiment of a system for synchronizing and mixing multiple streams at different sampling rates in accordance with this invention. In FIG. 2A, and also referring to FIG. 10, the ovals 210, 220, 230, 240, 260 and 270 represent buffers for receiving samples from input streams S1, S2, S3, S4, S5, S6 and S7, respectively. The ovals 215, 225, 235, 245, 255 and 265 represent intermediate buffers, and the oval 275 represent an output buffer. The upper line in each oval, A–G, 6A, 3B, 3C/2, 640D/147, 320E/147, 160F/147 and Q, each represent the size of the buffer. If the expression given is not an integer, the size of the buffer is the next larger integer. That is, if the expressed size is 3¼, the size of the buffer is 4. The lower line in each oval, 8k, 16k, 32k, 11.025k, 22.05k, 44.1k and 48k represent the sample rate corresponding to the samples in each buffer. That is, for example, oval 235 represents a buffer that contains up to 3*C/2 samples at a sampling rate of 48K, wherein C is the number of samples at sampling rate of 32K that can be contained in buffer 230.

The rectangular blocks 310–360 represent upsamplers that scale the sampling rate and the corresponding number of samples by the ratio shown in each block. In a preferred embodiment, the upsamplers can be fractional filters. That is, for example, block 330 is a fractional filter having a ratio of 2:3; therefore, for every 2 samples in buffer 230, 3 samples will be produced and output to buffer 235. After upsampling, buffer 235 contains an upsampled frame of samples corresponding to the frame of samples in buffer 230. The upsampled frame in buffer 235 corresponding to a frame of samples at a 48 kHz sampling rate, because the frame of samples in buffer 230 correspond to samples at a sampling rate of 32 k and are half tripled by the fractional filter 330.

Fractional filters are conventionally used to upscale or downscale sampling streams. As their name implies, fractional filters allow for upsampling or downsampling samples to and from sampling rates that are rational fractions of one another. That is, the ratio of each filter is a ratio of two integers. As is known in the art, fractional filters require a minimum number of input samples before computation can be performed. For example, an N-tap filter, by definition, produces an output that is dependent upon N prior samples; therefore, before the first output can be produced from an N-tap filter, at least N inputs must be received. A typical fractional filter for audio upsampling contains between 10 and 30 taps. In a preferred embodiment, the sizes A–G of the buffers 210, 220, 230, 240, 250, 260 and 270 are at least 20 samples. In one embodiment, the size of buffer 230 is at least 20 samples, and the size of buffers 240, 250 and 260 is at least 147 samples. The number of filter taps for both 1:2 and 2:3 upsampling may be for example N=59. Generally, the M input samples are needed to produce L output samples. If the number of input samples is less than M, the leading space can be filled with zeros.

Figure 2B:
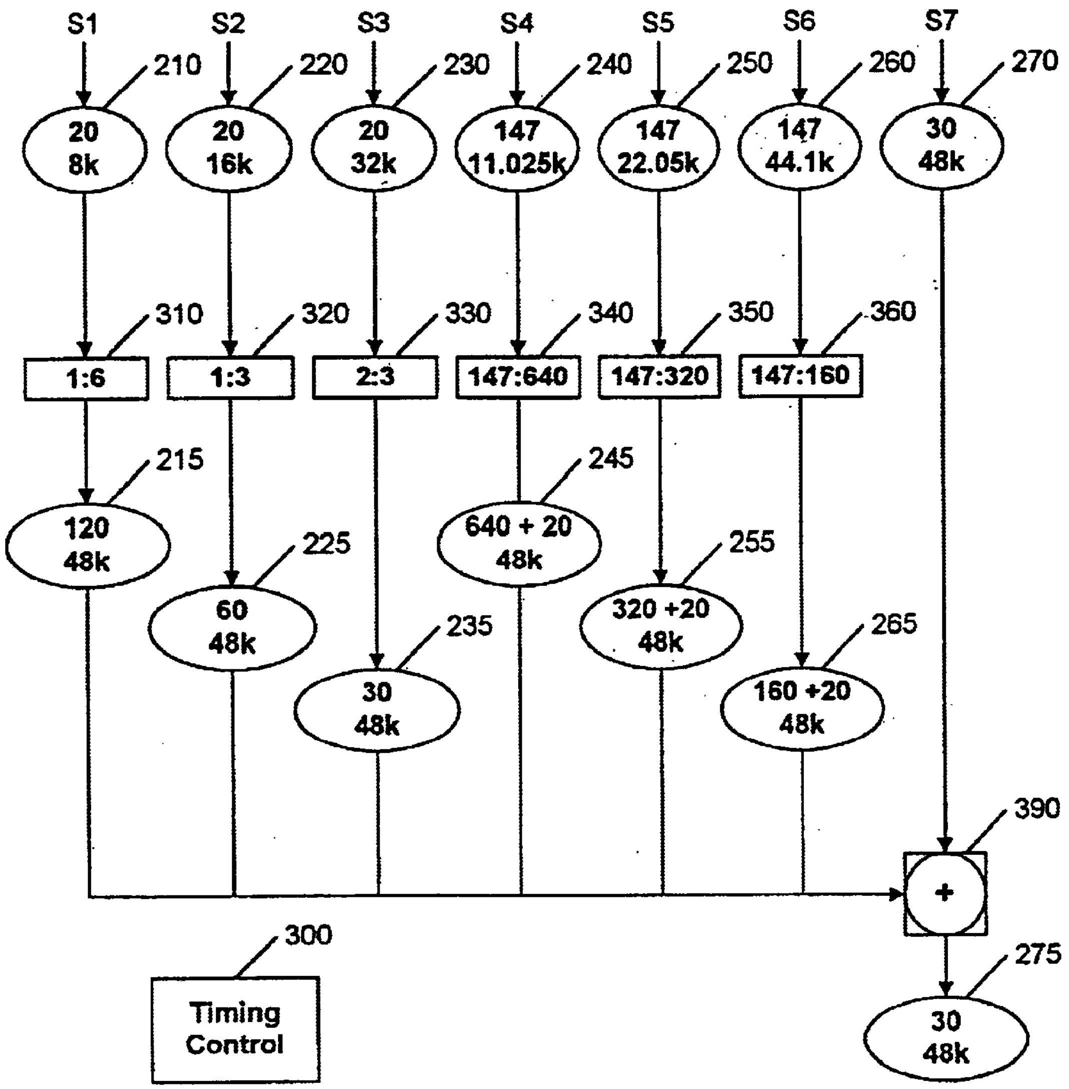

FIG. 2B illustrates the system of FIG. 2A with the sizes of each buffer corresponding to the example constraints above. Buffers 210, 220 and 230 are illustrated having a buffer size of 20 samples, and buffers 240, 250 and 260 are illustrated having a buffer size of 147. Corresponding to the minimum buffer sizes of input buffers 210, 220 and 230, intermediate buffers 215, 225 and 235 are illustrated having buffer sizes of 120 (6*20), 60 (3*20) and 30 (3*20/2), respectively. Corresponding to the minimum buffer sizes of input buffers 240, 250 and 260, intermediate buffers 245, 255 and 265 are illustrated having buffer sizes of 640 (640*147/147), 320 (320*147/147) and 160 (160*147/147) respectively, plus a small number of additional samples, the need for which will be presented with regard to the timing diagram of FIG. 3.

The selector-mixer 390 of FIGS. 2A and 2B selectively extracts samples from each of the buffers, combines them, and forms output samples that are stored in buffer 275 for further processing, or output via an audio decoding system. The combination of samples is summed without weights. The system pre-mixes the sixteen input streams with mixing at the same sampling-rates to have the seven input streams. The scaling for an individual sampled stream is done before the pre-mixing. For example, when applied to audio such as bird sounds (far away) and dog sounds (close) both bird sounds and dog sounds have a same sampling-rate. Before pre-mixing, they are scaled individually for the appropriate distances from the audience. For ease of understanding, the terms sum and add are used herein to include such non-uniform summations and additions. Because each of the buffers 215, 225, 235, 245, 255, 265 and 270 contain samples at the same sampling rate, 48 kHz, the contents of each buffer can be added to the contents of the other buffers to produce a composite output sample at the same sampling rate, 48 kHz. For efficiency, the selector-mixer 390 operates on a plurality of input samples to produce a frame of output samples. The size of the frame of output samples is limited to the size of the smallest buffer 235, because the selector-mixer 390 cannot process more samples than are available. In the example of FIG. 2B, selector-mixer 390 cannot process more than 30 samples at one time, and therefore the size of buffers 270 and 275 need only be 30 samples. Selector-mixer 390 continually processes the samples in buffers 215, 225, 235, 245, 255, 265 and 270 by selecting samples from each buffer in 30 sample increments to produce each output frame of 30 samples. The timing control 300 synchronizes the loading of the input buffers 210, 220, 230, 240, 250, 260 to assure that the up-sampled samples are available in the corresponding buffers 215, 225, 235, 245, 255 and 265 when each 30 sample output frame is formed by the selector-mixer 390. The processing of 64 output frames of 30 samples each produces one output super-frame. The output super-frame corresponding to the 40 ms, or 1920 samples, of the least common multiple of periods used in the conventional mixer. However, as compared to the conventional least-common-multiple mixer, the total buffer requirement in the example embodiment of FIG. 2B is 1951 samples.

Figure 3:
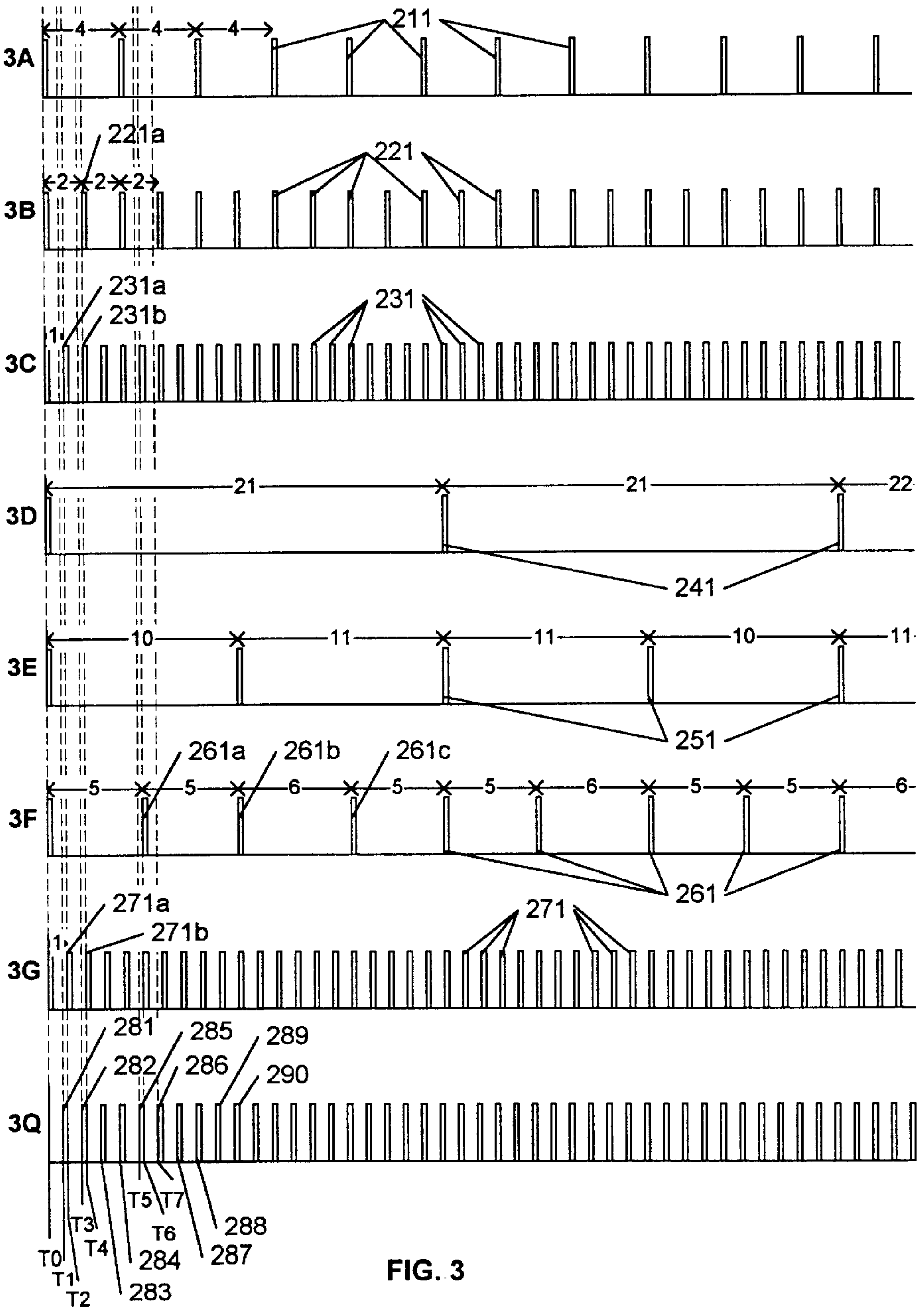
FIG. 3 illustrates an example timing diagram for the synchronization of multiple streams of data having different sampling rates in accordance with this invention.

FIG. 3 illustrates an example timing diagram corresponding to the operation of the timing control 300 of FIG. 2B. Lines 3A, 3B, 3C, 3D, 3E, 3F and 3G illustrate the timing control of the loading of buffers 210, 220, 230, 240, 250, 260 and 270, respectively. Line 3Q illustrates the timing control of the selector-mixer 390 to effect the loading of the output buffer 275. In accordance with this invention, the frame size of each input stream S1, S2, S3, S4, S5, S6 and S7 is the number of input samples illustrated in each oval representing the corresponding input buffers 210, 220, 230, 240, 250, 260 and 270 in FIG. 2B. At each occurrence of each load pulse 211, 221, 231, 241, 251, 261, 271, the associated input buffer 210, 220, 230, 240, 250, 260, 270 is loaded with one frame of samples from corresponding streams S1, S2, S3, S4, S5, S6 and S7, respectively. That is, at time T0 for example: 20 samples are loaded into each buffer 210, 220 and 230 from input streams S1, S2 and S3, respectively; 147 samples are loaded into each buffer 240, 250 and 260 from input streams S4, S5 and S6, respectively; and 30 samples are loaded into buffer 270 from input stream S7. At time T1, corresponding to load pulse 281 of line 3Q, 30 samples are selected from each of the buffers 215, 225, 235, 245, 255, 265 and 270 by the selector-mixer 390 to form an output frame of 30 samples that is stored in output buffer 275. The fractional filters 310–360 are designed such that the samples corresponding to each input buffer 210, 220, 230, 240, 250 and 260 are provided to the corresponding intermediate buffers 215, 225, 235, 245, 255 and 265 before they are required by the selector-mixer 390 at time T1. A subsequent process, not shown, extracts these samples from the buffer for subsequent processing as a composite signal having a sampling rate of 48 kHz.

The selection of the 30 samples by the selector-mixer 390 at time T1 results in a depletion of samples in the buffers 235 and 270. At time T2, corresponding to the load pulse 231*a* on line 3C, and load pulse 271*a* on line 3G, another 20 samples are loaded into buffer 230 from input stream S3, and another 30 samples are loaded into buffer 270 from input stream S7. The loading of the 20 samples into buffer 230 results in the production, by the fractional filter 330, of 30 corresponding samples in buffer 235. At time T3, corresponding to load pulse 282 of line 3Q, the selector-mixer 390 again selects 30 samples from each of the buffers 215, 225, 235, 245, 255, 265 and 270 to form an output frame of 30 samples that is stored in output buffer 275. As would be evident to one of ordinary skill in the art, it is assumed herein that the output samples are extracted from the output buffer 275 by the aforementioned subsequent processor during the interval between each load of the output buffer 275. When the 30 samples are extracted from each buffer at time T4, buffers 225, 235 and 270 are depleted. At time T4, load pulses 231*b*, 221*a* and 271*b* are generated to effect the replenishment of buffers 225, 235 and 270. This process continues such that load pulses 211, 221, 231, 241, 251, 261 and 271 are generated whenever each of the corresponding buffers 215, 225, 235, 245, 255, 265 and 270 contain fewer than 30 samples.

Note that at time T5, corresponding to load pulse 285, the selector mixer 390 will extract 30 samples from each buffer 215, 225, 235, 245, 255, 265 and 270 for the fifth time. Therefore, after this extraction, buffer 265 will contain 10 samples: the original 160 samples corresponding to the initial load at time T1 of 147 samples to buffer 260, less the 150 (5*30) samples selected and extracted by the selector mixer 390 in response to load pulses. 281, 282, 283, 284 and 285. Because 30 samples will be required at time T7, corresponding to load pulse 286, buffer 260 must be replenished. Therefore, at time T6, a load pulse 261*a* is generated to effect the load of the next 147 samples from input stream S6 into buffer 260. The fractional filter 360 produces 160 samples in response to these 147 samples. Therefore, the buffer 265 is designed to be sufficiently sized to contain the 10 aforementioned remaining samples, plus the newly produced 160 samples. These 170 samples in buffer 265 will be removed from the buffer 265 in 30 sample increments by the selector-mixer 390 in response to load pulses 286, 287, 288, 289 and 290. After load pulse 290 extracts 30 samples from buffer 265, there will be 20 (170–5*30) samples remaining in buffer 265. Therefore, a load pulse 261*b* is generated to replenish buffer 260. In response to this load pulse 261*b*, the buffer 260 is loaded with 147 samples, and the fractional filter 360 produces the corresponding 160 samples that are loaded into buffer 265. Therefore, the buffer 265 is designed to be sufficiently sized to contain the 20 aforementioned remaining samples, plus the newly produced 160 samples. These 180 samples will be extracted by the selector-mixer 390 in 30 sample increments, such that after 5 such extractions, buffer 265 will have 30 remaining samples, and after 6 such extractions will have no remaining samples. Thus, the next load pulse 261*c* is generated after 6 output frame cycles, as compared to load pulses 261*a* and 261*b* which occurred after 5 output frame cycles. That is, the timing control 300 is designed to produce an irregular 5-5-6 pattern of load pulses for buffer 260, and buffer 265 is sized to accommodate the effects of the non-uniformity between the loading of the buffer 260 and the extraction of samples by the selector-mixer 390.

In a similar manner, the timing control 300 generates load pulses 251 corresponding to an irregular 10-11-11 pattern of output frame cycles. That is, initially 320 samples are produced by the fractional filter 350 and stored in buffer 255. After the first 10 output frame cycles, buffer 355 contains 20 remaining samples, a load pulse 251 is generated, and the buffer 255 is replenished to contain 340 samples (320+20). After the next 11 output frame cycles, buffer 255 contains 10 remaining samples, another load pulse 251 is generated, and the buffer 255 is replenished to contain 330 samples (320+10). These 330 samples are depleted during the next 11 output frame cycles, and this irregular 10-11-11 pattern is repeated. Similarly, the timing control 300 generates load pulses 241 corresponding to an irregular 21-21-22 pattern of output frame cycles. The system keeps the synchronization frame period 40 ms and the synchronization number of samples 1920 unchanged.

As described, each input stream S1, S2, S3, S4, S5, S6 and S7 have input frame sizes of 20, 20, 20, 147, 147, 147 and 30 samples, respectively, and an output frame size of 30 samples. These frame sizes are not uniform in time, as compared to a conventional system that formulates each of the input and output frame sizes in dependence upon a common multiple of time, such as the 40 ms period corresponding to 1920 output samples. By formulating the frame size of each input stream in dependence upon the buffer sizes required to effect the desired up-sampling, rather than upon a least common multiple of time periods, the buffer requirements are substantially reduced. The synchronization of these non-uniform frames is effected by the timing control 300 by formulating a sequence of irregular load pulse patterns that effect a fully synchronous system in dependence upon the relationship between these non-uniform input frames and the output frame.

Figure 4A:
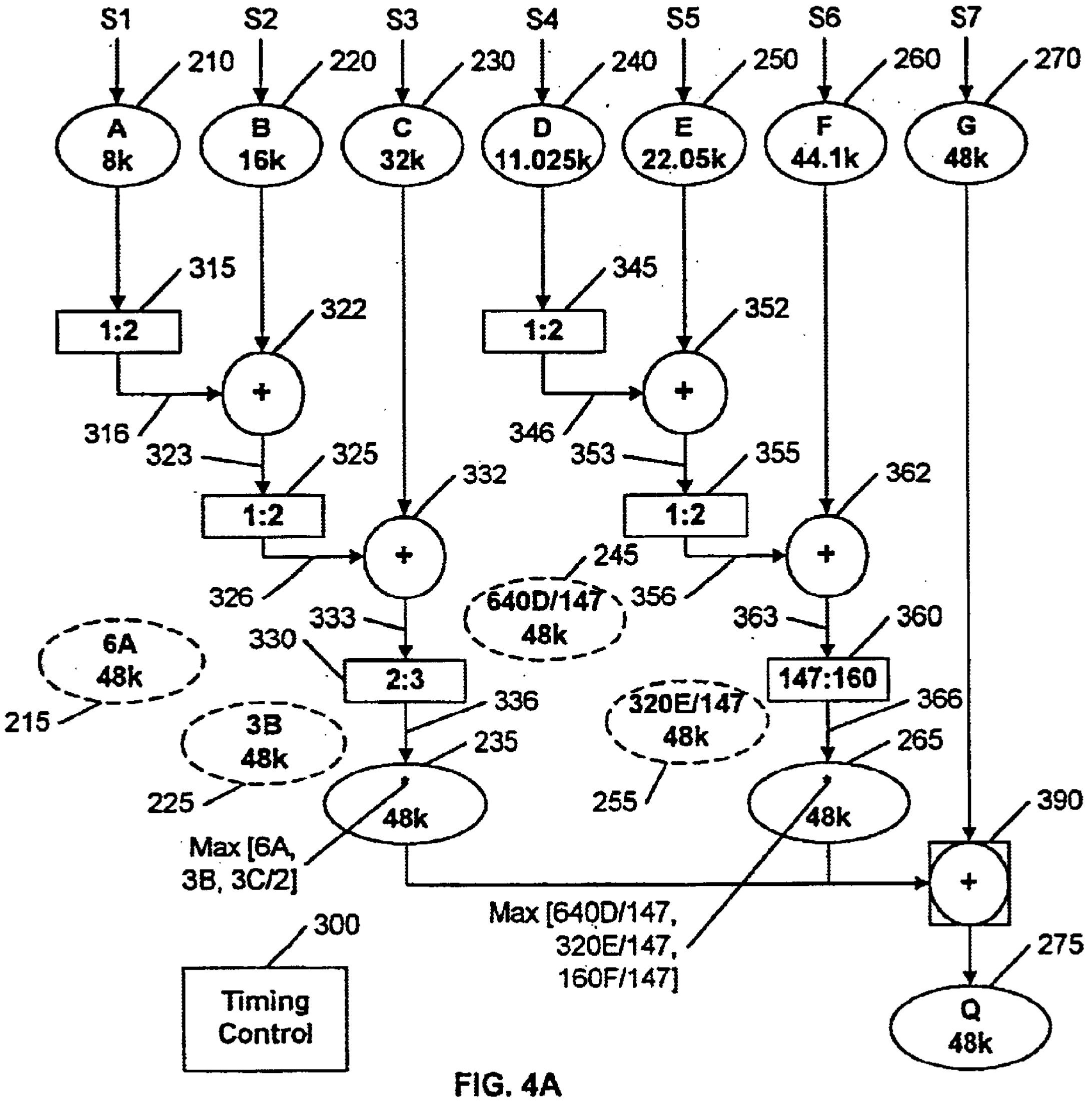
FIGS. 4A and 4B illustrate an example block diagram of an alternative system that synchronizes multiple streams of data having different sampling rates in accordance with this invention.

FIG. 4A illustrates a further example embodiment of a system for synchronizing and mixing multiple streams at different sampling rates in accordance with this invention that takes advantage of the relationships among input streams to further reduce the number and size of buffers required. This optimization is premised on the observation that samples may be combined whenever their sampling rate is equal. By combining input samples before the selector-mixer 390 stage, efficiencies in both processing time and buffer utilization can be achieved. In the example of FIG. 4A, the samples in the buffer 210, corresponding to a sampling rate of 8 kHz, are upsampled by the 1:2 fractional filter 315 to produce twice as many samples, corresponding to a sampling rate of 16 kHz. Each of these 16 kHz samples 316 is combined with each of the samples from buffer 220, also corresponding to a sampling rate of 16 kHz, by the intermediate mixer 322 to produce composite samples 323 at a sampling rate of 16 kHz. The 16 kHz composite samples 323 are upsampled by the 1:2 fractional filter 325, to produce twice as many samples 326, corresponding to a sampling rate of 32 kHz. These 32 kHz sampled signals are combined with the samples from buffer 230, also corresponding to a 32 kHz sampling rate, by the intermediate mixer 332 to produce composite samples 333 corresponding to a 32 kHz sampling rate. Thus, the composite samples 333 contain the combination of the signals from the 8 kHz sampling rate buffer 210, the 16 kHz sampling rate buffer 220, and the 32 kHz sampling rate buffer 230. This composite sample 333 is upsampled by the 2:3 fractional filter 330 to produce samples 336 corresponding to a 48 kHz sampling rate (32 kHz*3/2) that are stored in the buffer 235. As shown by the dashed ovals 215' and 225', the buffers 215 and 225 of FIG. 2A are not required in this embodiment of the invention.

In a similar manner, the 11.025 kHz sampled signals in buffer 240 are upsampled by the 1:2 fractional filter 345 to produce samples 346 corresponding to a 22.05 kHz sampling rate. The samples 346 are combined with the samples of buffer 250 by the intermediate mixer 352 and the composite samples 353 are upsampled by the 1:2 fractional filter 355 to produce samples 356 corresponding to a 44.1 kHz sampling rate. The samples 356 are combined with the samples of buffer 260 by the intermediate mixer 362 and the composite samples 363 are upsampled by the 147:160 fractional filter 360 to produce samples 366 corresponding to a 48 kHz sampling rate. The samples 366, which are the combination of the samples in the 11.025 kHz sampling rate buffer 240, the samples in the 22.05 kHz sampling rate buffer 250, and the samples in the 44.1 kHz sampling rate buffer 260, are stored in the buffer 265. As shown by the dashed ovals 245' and 255', the buffers 245 and 255 of FIG. 2A are not required in this embodiment of the invention.

The minimum sizes of the buffers 210–275 are determined in a similar manner as discussed with regard to FIG. 2A. All buffers that provide an input to a fractional filter have a minimum size of 20 samples, or the number required by the ratio of the fractional filter, whichever is greater. Buffers 210, 220, 230, 240, 250 and 260, therefore, must have a minimum size of at least 20 samples. Corresponding to this minimum buffer size requirement, buffer 275 must have a minimum size of at least 120 samples, because the 20 samples of buffer 210 are upsampled by a factor of 6((1:2)*(1:2)*(2:3) =2/1*2/1*3/2=6) and therefore produce 120 samples that must be stored. These 120 samples corresponding to the 20 samples of buffer 210 must be combined with an equal number of samples from buffers 220 and 230. The samples of buffer 220 are upsampled by a factor of 3 ((1:2*(2:3)=3); therefore, to produce 120 samples, buffer 220 must have a minimum size of 40 samples (120/3). Similarly, the samples of buffer 230 are upsampled by a factor of 3/2, and, to produce 120 samples, buffer 230 must have a minimum size of 80 samples (120*2/3). These buffer sizes are illustrated in FIG. 3B.

Figure 4B:
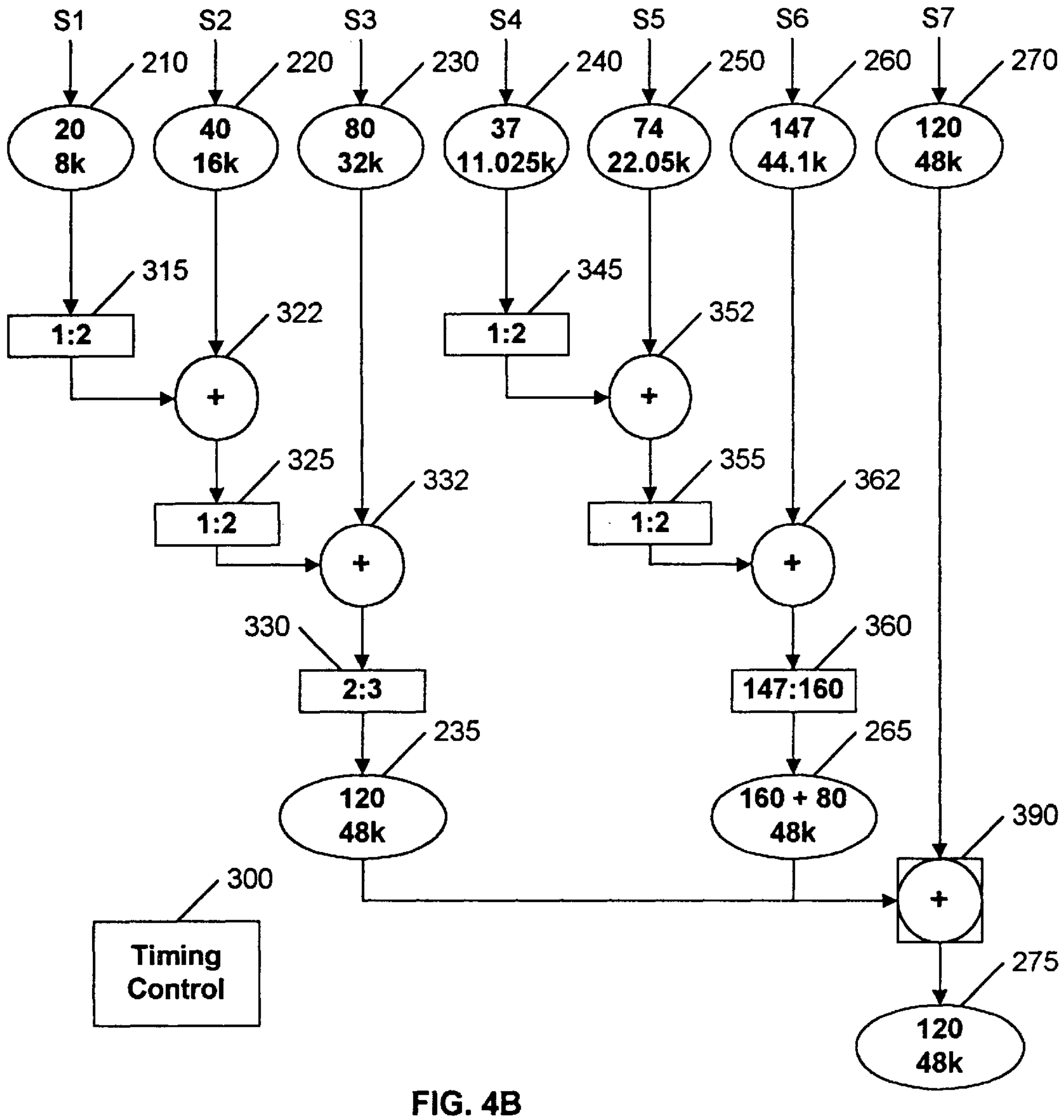

In a similar manner, it can be shown that buffer 265 must have a minimum size of at least 88 samples (20 samples*2*2*160/147), corresponding to the upsampling of the minimum number of samples in buffer 240. However, this is not the limiting constraint on buffer 265. Buffer 260 must provide 147 samples to the 147:160 fractional filter, and therefore buffer 260 has a minimum size of 147 samples, and buffer 265 has a minimum size of 160 to receive these upsampled samples. Using the same form of analysis as above, buffer 240 therefore has a minimum size of 37 samples (160/(2*2*160/147)), and buffer 250 has a minimum size of 74 samples (160/(2*160/147)). These buffer sizes are illustrated in FIG. 4B. As discussed below, an additional 80 samples are provided in buffer 265, to account for the replenishment of the buffer 265 while there are remaining samples in the buffer 265.

The selector-mixer 390 selects and mixes samples from each of the buffers 235, 265 and 270 to produce an output frame. The size of the frame of output samples is limited to the size of the smallest buffer 235, because the selector-mixer 390 cannot process more samples than are available. The selector-mixer 390 therefore selects and mixes 120 samples from each of the buffers 235, 265 and 270 to produce an output frame consisting of 120 output samples, which are stored in buffer 275. Therefore, buffers 270 and 275 have a minimum buffer size of 120 samples. The timing control 300 synchronizes the loading of the input buffers 210, 220, 230, 240, 250, 260 and 270, using the same principles as discussed with regard to FIG. 3. Initially, the timing control 300 effects the loading of all the input buffers 210, 220, 230, 240, 250, 260 and 270. Note that the load of one frame of each of the inputs 210, 220, 230 results in the production of 120 samples in buffer 235. These 120 samples in buffer 235 are extracted by the selector-mixer 390 for each output frame of 120 samples. Therefore, the input buffers 210, 220 and 230 are loaded at the same rate as the output frame. The extraction of 120 samples from buffer 265 by the selector-mixer 390 will leave 40 remainder samples (160–120) in the buffer 265. Because the remainder samples are fewer than 120 samples, the timing control 300 generates a load pulse to replenish the input buffers 240, 250 and 260.

In response, the fractional filters 345, 355 and 360 produce the next 160 samples that are stored in buffer 265. Therefore, buffer 265 is sized to contain at least 200 (160+40) samples. The extraction of the next 120 samples from buffer 265 leaves a remainder of 80 samples (200–120). Therefore buffer 265 is sized to contain at least 240 (160+80) samples. These 240 samples are extracted in 120 sample increments at each of the next two output frame cycles, leaving no remainder. That is, the timing control generator generates a load pulse for each of the input buffers 240, 250 and 260 in an irregular 1-1-2 pattern. As illustrated in FIG. 4B, by combining samples prior to the selector-mixer 390 stage, the total buffer size requirement is 998 samples, which is significantly less than that required by the least-common-multiple mixing techniques conventionally employed. Also in this alternative embodiment, only two load pulse sequence patterns need be generated. A load pulse sequence corresponding to each output frame loads buffers 210, 220, 230 and 270, and an irregular 1-1-2 pattern of load pulse sequences loads buffers 240, 250, 260, to provide three load pulses for each four output frames.

The selector-mixer 390 continually processes the samples in buffers 235, 265 and 270 by selecting samples from each buffer in 120 sample increments to produce each output frame of 120 samples. After processing 16 frames, one output super-frame is produced, corresponding to the 40 ms, or 1920 samples, of the least common multiple of periods used in the conventional mixer.

Figure 5:
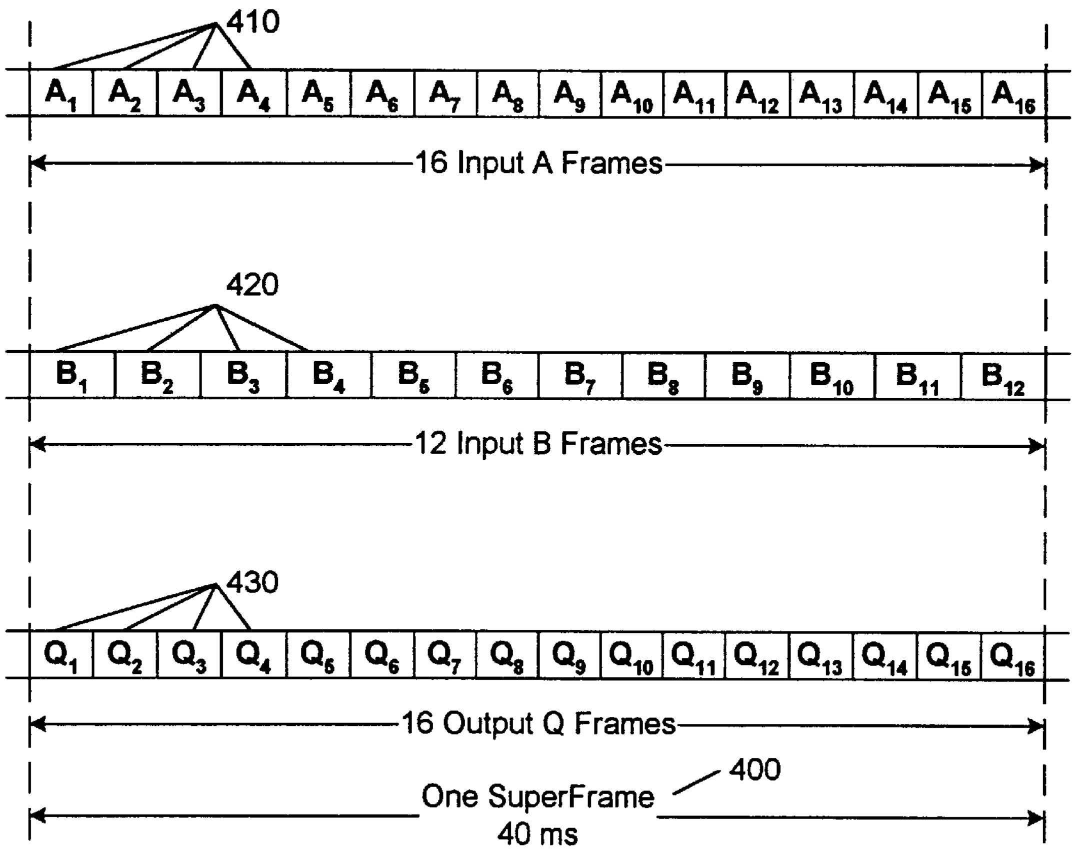
FIG. 5 illustrates another example timing diagram for the synchronization of multiple streams of data having different sampling rates in accordance with this invention.

FIG. 5 illustrates a timing diagram of an example operation of the selector-mixer 390 for selecting and mixing data from two input buffers, such as buffers 235 and 265. Buffer 235 has a size of 120 samples, and each block of 120 samples of buffer 235 are herein defined as an input frame, identified as input A frames 410 in FIG. 5. Similarly, each block of 160 samples of buffer 265 are identified as input B frames 420. Within the one 40 ms super-frame 400, there are 16 input A frames 410, and 12 input B frames 420. One input A frame 410 corresponds to the input of 20 samples to buffer 210, 40 samples to buffer 220, and 80 samples to buffer 230. Thus, the 8 kHz sampled signals that are provided to buffer 210 are said to have an input frame size of 20 samples; the 16 kHz sampled signals that are provided to buffer 220 have an input frame size of 40 samples; and the 32 kHz sampled signals that are provided to buffer 230 have an input frame size of 80 samples. Similarly, one input B frame 420 corresponds to 36¾ samples at 11.025 kHz in buffer 240, 73½ samples at 22.05 kHz in buffer 250, and 147 samples at 44.1 kHz in buffer 260. Fractional samples are formed by repetitively forming alternate sized frames. For example, the 11.025 kHz frames consist of three 37 sample frames and one 36 sample frame, thereby providing an overall 36¾ sample frame size. Similarly, the 22.05 kHz frames consist of alternating 74 and 73 sample frames.

Figure 6:
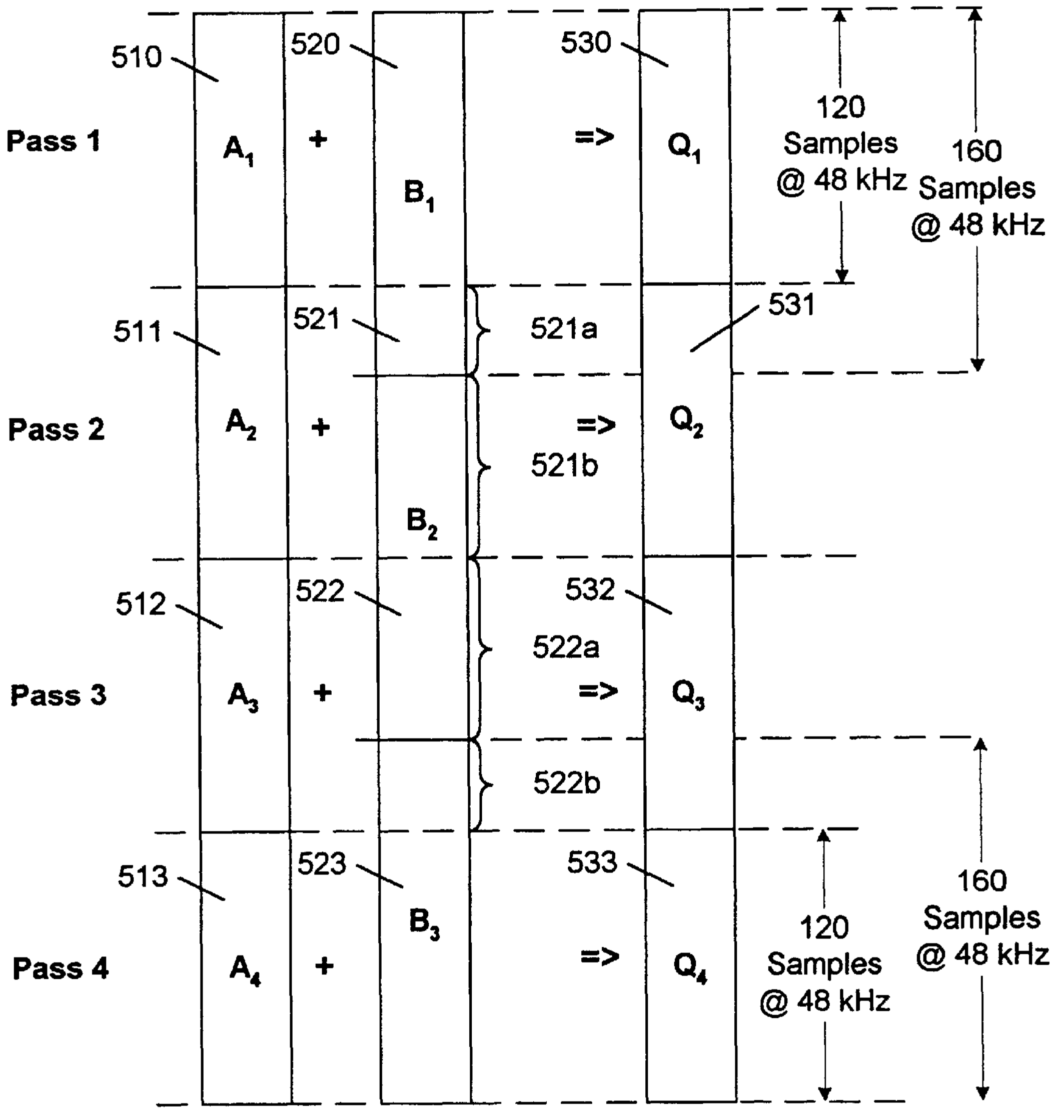
FIG. 6 illustrates an example timing diagram for the synchronization of input and output frames having differing frame sizes in accordance with this invention.

The selector-mixer 390 forms each superframe 400 by forming 16 output Q frames 430. The formation of each of the output Q frames 430 is termed a pass; 16 passes form one superframe 400. At each pass, the selector-mixer 390 selects 120 samples from each buffer 235, 265, as shown in FIG. 6. At pass 1, the samples 510 of input A frame $A_1$ are combined with corresponding samples 520 of input B frame $B_1$ to form output Q frame $Q_1$ 530. As shown, the input B frame $B_1$is larger than the output Q frame $Q_1$, therefore not all of the samples of input B frame $B_1$ are used to form output Q frame $Q_1$. At pass 2, the samples 511 of input A frame $A_2$ are combined with corresponding samples 521 of input B frames $B_1$ and $B_2$. That is, the samples 521 a of input B frame $B_1$ that were not used to form output Q frame $Q_1$ are used to form the first forty samples of output Q frame $Q_2$, and the samples 521*b* of input B frame $B_2$ are used to form the remaining samples of output Q frame $Q_2$. The output Q frame $Q_3$ is similarly formed from samples of input A frame $A_3$, and the remaining samples 522*a* of input B frame $B_2$ and samples 522*b* of input B frame $B_3$. Note that at pass 4, there are exactly 120 remaining samples 523 of input B frames $B_3$. These samples are combined with the 120 samples of input A frame $A_4$ to form the output Q frame $Q_4$.

FIG. 7 illustrates the synchronization of input A frames and input B frames to effect the synchronous formation of sixteen output Q frames, thereby effecting the synchronous formation of each superframe 400. At pass 1 through pass 3, each of the input A frames $A_1$, $A_2$ and $A_3$ and each of the input B frames $B_1$, $B_2$ and $B_3$, are input, and the output Q frames $Q_1$, Q2 and $Q_3$ are formed as discussed above. At pass 4, corresponding to the aforementioned irregular 1-1-2 pattern of forming 4 output frames from 3 input frames, no input B frames are input. As discussed above, output Q frame $Q_4$ is formed from input A frame $A_4$ and the samples of input B frame $B_3$ that remain in the buffer 265. Similarly, at passes 8, 12 and 16, the residual samples in buffer 265 are used and no input B frames are input.

Figure 8:
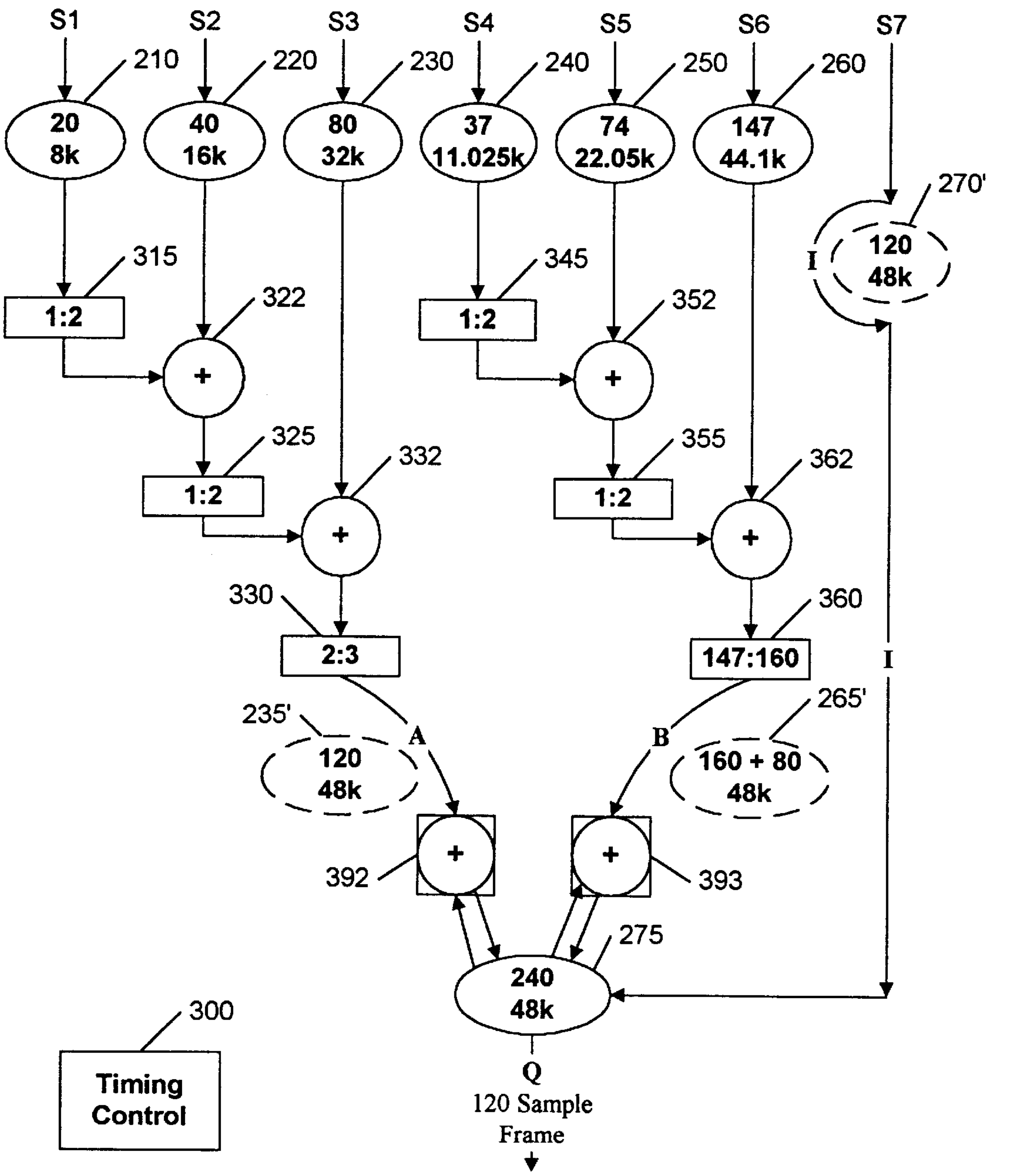
FIG. 8 illustrates an example block diagram of another alternative system that synchronizes multiple streams of data having different sampling rates in accordance with this invention.

FIG. 8 illustrates another embodiment of a system for synchronizing and mixing multiple streams at different sampling rates in accordance with this invention. In FIG. 8, the output buffer 275 is a mixing buffer, incorporating the functions of each of the buffers 235, 265, 270 and 275 of FIG. 4B, and the selector-mixer 390 is replaced by incrementing mixers 392 and 393. As previously presented, with reference to FIG. 4B, the selector-mixer 390 selects 120 samples from each of the buffers 235, 265 and 270, and combines them to form 120 output samples. The incrementing mixers 392 and 393 perform this combining function directly, using the output buffer 275 as a mixing buffer.

The samples from input stream S7 are loaded directly into the output buffer 275 to initialize its contents. These initializing frames are identified as I frames in FIG. 8. The incrementing mixer 392 adds each sample of A frames from the fractional filter 330 to a corresponding each sample that is contained in the buffer 275. The incrementing mixer 393 adds each sample of B frames from the fractional filter 360 to a corresponding each sample that is contained in the buffer 275. In this manner, buffer 275 contains the combination of frames I, A and B, without the need for the intermediate buffers 235 and 265, and input buffer 270. The elimination of these buffers is indicated by the dashed ovals 235', 265' and 270' in FIG. 8. As illustrated in FIG. 8, the total buffer requirement has been reduced to 638 samples in this embodiment.

As is common in the art, a circular buffer architecture is used to efficiently utilize the available space in the buffer 275. Samples are stored in the buffer 275 into sequential memory locations; when the memory location at the end of the buffer 275 is reached, the next sample is stored at the beginning of the buffer 275 and sequential memory locations thereafter.

Figure 9:
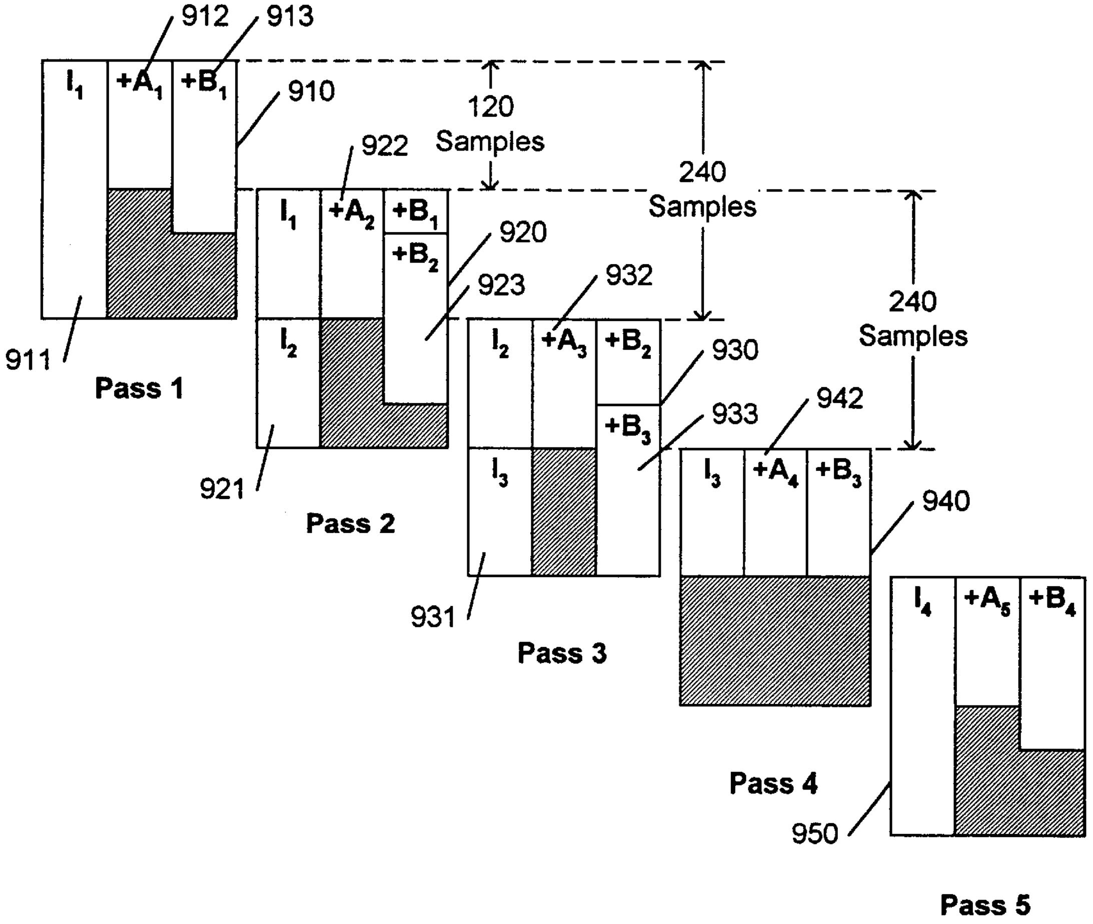
FIG. 9 illustrates an example sequence pattern for the loading of a mixing output frame buffer in accordance with this invention.

Because the incrementing mixers 392 and 393 add sample values from the fractional filters 330 and 360 to the contents of the buffer 275 and store the result back to the buffer 275, the timing control 300 is designed to assure that the contents of the buffer 275 are coherent. That is, the contents of the buffer 275 must be appropriately initialized before the incrementing mixers 392 and 393 add samples values to these contents, and the contents of the buffer 275 must not be reinitialized until after the incrementing mixers 392 and 393 add their samples. FIG. 9 illustrates an example method for managing the contents of the buffer 275. Each of the rectangles 910, 920, 930, 940 and 950 represent the contents of the buffer 276 at each of five sequential output frame periods, or passes. At pass 1, the buffer is completely initialized by a 240 sample frame of input stream S7. This italization is illustrated by the block 911 of buffer representation 910. The frame size of input stream S7 is nominally 120 samples, as noted above. To effect the initialization of the buffer 275 with a double sized frame $I_1$, the timing control 300 issues, for example, two load pulses to the buffer 275. The timing control 300 also issues a load pulse to the input buffers 210, 220 and 230 which effects the generation of the samples of a frame $A_1$by the fractional filters 315, 325 and 330. The timing control 300 also issues a load pulse to the input buffers 240, 250 and 260 which effects the generation of the samples of a frame $B_1$ by the fractional filters 345, 355 and 360. In general, the load of the buffer 275 with input samples from stream S7 is accomplished before the fractional filters 330 and 360 begin to produce samples in response to the load pulses applied to buffers 210, 220, 230, 240, 250 and 260. Therefore the buffer will be initialized with the 240 samples from stream S7 before the incrementing adders 392 and 393 commence the addition of samples to the contents of the buffer 275. Alternatively, the load pulses applied to buffers 210, 220, 230, 240, 250 and 260 can be delayed relative to the load pulses applied to buffer 275 to assure this initialization. As would be evident to one of ordinary skill in the art, the initialization of the output buffer 275 may be effected by setting the memory locations that are to be initialized to zero. In such an embodiment, the samples from input stream S7 are provided to the buffer 275 via another incrementing mixer.

During pass 1, after the buffer 275 is initialized by frame $I_1$, the incrementing adder 392 adds each of the 120 samples corresponding to frame $A_1$ to the contents of the buffer 275. This is illustrated by block 912 of buffer representation 910. Also during pass 1, after the buffer 275 is initialized by frame $I_1$, the incrementing adder 393 adds each of the 160 samples corresponding to frame $B_1$ to the contents of the buffer 275. This is illustrated by block 913 of buffer representation 910. Note that the specific sequence of incrementally adding samples of frames $A_1$ and $B_1$ is of no significance. That is, it is immaterial whether the contents of a memory location in the buffer 275 is the value of the sample from frame $I_1$ or the value of the sample from frame $B_1$ added to the sample from frame $I_1$. At the end of pass 1, the contents of the buffer 175 is as follows: the contents of the first 120 memory locations will be the sum of the first 120 samples of each frame $I_1$, $A_1$, and $B_1$; the contents of the next 40 memory locations will be the sum of the $121^{st}$ to $160^{th}$ samples of frame $I_1$ and $B_1$; and the contents of the remaining 80 memory locations will be the $161^{st}$ to $240^{th}$ samples of frame $I_1$. The first 120 samples are provided to the aforementioned subsequent processor, not shown, and the corresponding first 120 memory locations of buffer 275 are available for loading in pass 2.

At pass 2, the timing control 300 issues a load pulse to buffer 275 to input the next frame of input stream S7. As illustrated by block 921 in buffer representation 920, this results in a 120 sample frame $I_2$ being placed in the buffer 275, immediately following the remaining 120 samples of frame $I_1$ that were not extracted from the buffer 275 in pass 1. Buffer representation 920 illustrates the operation of a circular buffer. The second half of the buffer 275, comprising 120 samples, is represented in representation 920 adjacent to the second half of the buffer 275 in representation 910. Below these 120 samples in representation 920 is a representation of another 120 samples of the buffer 275. These 120 samples are located in the first half of buffer 275, from which the first 120 samples were extracted, but are shown below the second half of buffer 275 to show the sequence of loading this buffer 275 in a top-down manner.

Also at pass 2, the timing control 300 issues a load pulse to buffers 210, 220 and 230 to input the next frames of input streams S1, S2 and S3. As illustrated by block 922 in buffer representation 920, this results in a 120 sample frame $A_2$ being placed in the buffer 275, immediately following, the location of the 120 samples of frame $A_1$ that were extracted from the buffer 275 in pass 1. Also at pass 2, the timing control 300 issues a load pulse to buffers 240, 250 and 260 to input the next frames of input streams S4, S5 and S6. As illustrated by block 923 in buffer representation 920, this results in a 160 sample frame $B_2$ being placed in the buffer 275, immediately following the location of the remaining 40 samples of frame $B_1$ that were not extracted from the buffer. 275 in pass 1. At the end of pass 2, the contents of the second half of the buffer 275 are as follows: the first 40 samples are the sum of the $121^{st}$ to $160^{th}$ samples of frame $I_1$, the first 40 samples of frame $A_2$, and the last 40 samples of frame B1; the next 80 samples are the sum of the $161^{st}$ to $240^{th}$ samples of frame $I_1$, the last 80 samples of frame $A_2$, and the first 80 samples of frame $B_2$. These 120 samples are provided to the aforementioned subsequent processor and the corresponding second half of buffer 275 is available for loading in pass 3.

In a similar manner, in pass 3, the timing controller 300 issues load pulses to buffers 210, 220, 230, 240, 250, 260 and 275 to load frames $I_3$, $A_3$ and $B_3$ as illustrated in buffer representation 930. The 120 samples in the first half of buffer 275 are provided to the aforementioned subsequent process. At the end of pass 3, the second half of buffer 275 contains the 120 samples of frame $I_3$ and the last 120 samples of frame $B_3$. Therefore, at pass 4, the timing control 300 need merely issue a load pulse to buffers 210, 220 and 230 to effect the addition of 120 samples of frame $A_4$ to the buffer 275. As illustrated by the buffer representation 940 of FIG. 9, there are exactly 1220 samples in the buffer 275 at the end of pass 4; these 120 samples are provided to the aforementioned subsequent processor, and the entire buffer 275 is available for loading in pass 5. As can be seen in buffer representation 950, pass 5 is a repetition of pass 1, buffer representation 910. That is, the process continues by repeating the sequence of frame loading illustrated by buffer representation s 910, 920, 930 and 940.

It should be understood that the implementation of other variations and modifications of the invention in its various aspects will be apparent to those of ordinary skill in the art, and that the invention is not limited by the specific embodiments described. For example, the individual fractional filters 315, 325, 245 and 355 may be a single 1:2 fractional filter that is multiplexed in time to provide the 1 to 2 upsampling function represented by the individual blocks 315, 325, 245 and 355 in a sequential manner. Similarly, although fractional filters are presented herein to affect the desired upsampling, other techniques common in the art for modifying sampling rates may be used. It is also recognized by one of ordinary skill in the art that this invention may be implemented in hardware, software, firmware, or a combination thereof. For example the timing control 300 may be a[s] sequence of software commands that affect the loading of input and output buffers that are implemented in hardware, and the fractional filters may be a programmable digital signal processor. It is also recognized that alternative structures may be used; for example, the individual buffers illustrated may each be a part of a single memory structure, or may be a part of the processing systems that precede or succeed the processing components illustrated in this disclosure. Similarly, the implementation of the buffers and the fractional filters may be integrated, such that all or part of the buffers presented herein may be included within the structure of the fractional filters. Similarly, although the mixing of signals is commonly performed as a sum of corresponding samples, special effects may be produced by using other combination and mixing functions. It is therefore contemplated to cover by the present invention, any and all modifications, variations, or equivalents that fall within the spirit and scope of the basic underlying principles disclosed and claimed herein.

What is claimed is:

1. A system for synchronizing multiple streams of data at multiple sampling rates comprising:

a plurality of input buffers that each store corresponding frames of samples from an each stream of the multiple streams of data, each input buffer of the plurality of input buffers being associated with an each sampling rate of the multiple sampling rates, a plurality of upsamplers, operably coupled to at least two input buffers of the plurality of input buffers, that each produce a plurality of upsampled samples corresponding to each sample of the frame of samples in the at least two input buffers, a mixer, operably coupled to the plurality of upsamplers, that combines each of the plurality of upsampled samples of each sample in the at least two input buffers to form an each output sample of a frame of output samples, a timing control, operably coupled to the input buffers, that synchronizes the multiple streams of data by applying an irregular sequence of load pulses to at least a first input buffer of the at least two input buffers to effect an irregular loading of frames of samples from at least one of the multiple streams of data, and at least one intermediate buffer, operably coupled to an at least one upsampler of the plurality of upsamplers and to the mixer, that stores the plurality of upsampled samples produced by the at least one upsampler for subsequent selection by the mixer.

2. The system of claim 1, wherein the upsamplers are fractional filters.

3. The system of claim 1, further including:

at least one intermediate mixer, operably coupled to an at least one upsampler of the plurality of upsamplers and to an at least one input buffer, that combines a corresponding frame of samples from the at least one input buffer with the plurality of upsampled samples produced by the at least one upsampler.

4. The system of claim 1, wherein the frame of output samples has a first frame period and the frame of samples corresponding to the first input buffer has a second frame period that is greater than the first frame period.

5. The system of claim 1, wherein the mixer includes:

a mixing output buffer, and at least one incrementing mixer, operably coupled to the mixing output buffer, that combines each of the plurality of upsampled samples to contents of the mixing output buffer to form the frame of output samples.

6. A system for synchronizing multiple streams of data at multiple sampling rates comprising:

a plurality of input buffers that each store corresponding frames of samples from an each stream of the multiple streams of data, each input buffer of the plurality of input buffers being associated with an each sampling rate of the multiple sampling rates, a plurality of upsamplers, operably coupled to at least two input buffers of the plurality of input buffers, that each produce a plurality of upsampled samples corresponding to each sample of the frame of samples in the at least two input buffers, a mixer, operably coupled to the plurality of upsamplers, that combines each of the plurality of upsampled samples of each sample in the at least two input buffers to form an each output sample of a frame of output samples, a timing control, operably coupled to the input buffers, that synchronizes the multiple streams of data by applying an irregular sequence of load pulses to at least a first input buffer of the at least two input buffers to effect an irregular loading of frames of samples from at least one of the multiple streams of data, at least one intermediate buffer, operably coupled to an at least one upsampler of the plurality of upsamplers and to the mixer, that stores the plurality of upsampled samples produced by the at least one upsampler for subsequent selection by the mixer, and at least one intermediate mixer, operably coupled to an at least one upsampler of the plurality of upsamplers and to an at least one input buffer, that combines a corresponding frame of samples from the at least one input buffer with the plurality of upsampled samples produced by the at least one upsampler.

* * * * *